United States Patent

Yowell

[15] 3,644,067
[45] Feb. 22, 1972

[54] POWER TRANSMISSION

[72] Inventor: Gordon H. Yowell, North Branch, Mich.

[73] Assignee: Sperry Rand Corporation, Troy, Mich.

[22] Filed: May 25, 1970

[21] Appl. No.: 40,176

[52] U.S. Cl. .............................. 417/370, 417/372, 417/423
[51] Int. Cl. ............... F04b 17/00, F04b 35/00, F04b 39/02, F04b 39/06
[58] Field of Search .................. 417/357, 247, 369, 370, 371, 417/372, 423, 424, 901

[56] References Cited

UNITED STATES PATENTS 3,267,868  8/1966  Page ........................................ 417/370
2,194,054  3/1940  Peterson .................................. 417/247

*Primary Examiner*—Robert M. Walker
*Attorney*—Van Meter and George

[57] ABSTRACT

An electric motor-pump unit utilizes a hollow drive shaft supporting the motor rotor and the pump impeller. A sleeve within the hollow shaft forms a reentrant passage for conducting a portion of the pumped fluid into heat conducting relation with the motor rotor for cooling purposes. The unit is especially adapted for driving and supercharging high-pressure hydraulic pumps in aircraft.

2 Claims, 2 Drawing Figures

INVENTOR.
Gordon H. Yowell

INVENTOR.
Gordon H. Yowell

POWER TRANSMISSION

In the construction of electric motors for use in aircraft flying at very high altitudes, a problem arises in keeping the motor cool because of the lack of sufficient air density. Where such motors are combined with a booster pump and are used for driving and supercharging a high-pressure hydraulic pump, cooling at extremely high altitudes has been provided by flooding the interior of the motor with incoming hydraulic fluid. This, however, introduces severe fluid friction losses due to the churning affect of the motor rotor.

It is an object of the present invention to provide an improved electric motor pump unit wherein the fluid being pumped is utilized to cool the motor without incurring such losses.

A further object is to provide a motor pump unit in which the circulation of cooling fluid is utilized to provide lubrication for a bearing of the pump and to cool the shaft seal directly.

The invention consists in an electric motor-pump unit with a motor stator and rotor, a hollow drive shaft carrying the rotor in heat conducting relation thereto, a centrifugal pump having a stator and an impeller carried by the motor stator and the drive shaft respectively, inlet and outlet passages for the pump, and means forming a reentrant fluid passage within the drive shaft in heat conducting relation to the motor rotor, and passages connecting the opposite ends of the reentrant passage with the intake and delivery side of the impeller whereby a portion of the fluid delivered by the pump is bypassed through the shaft for cooling purposes.

Figure 1:
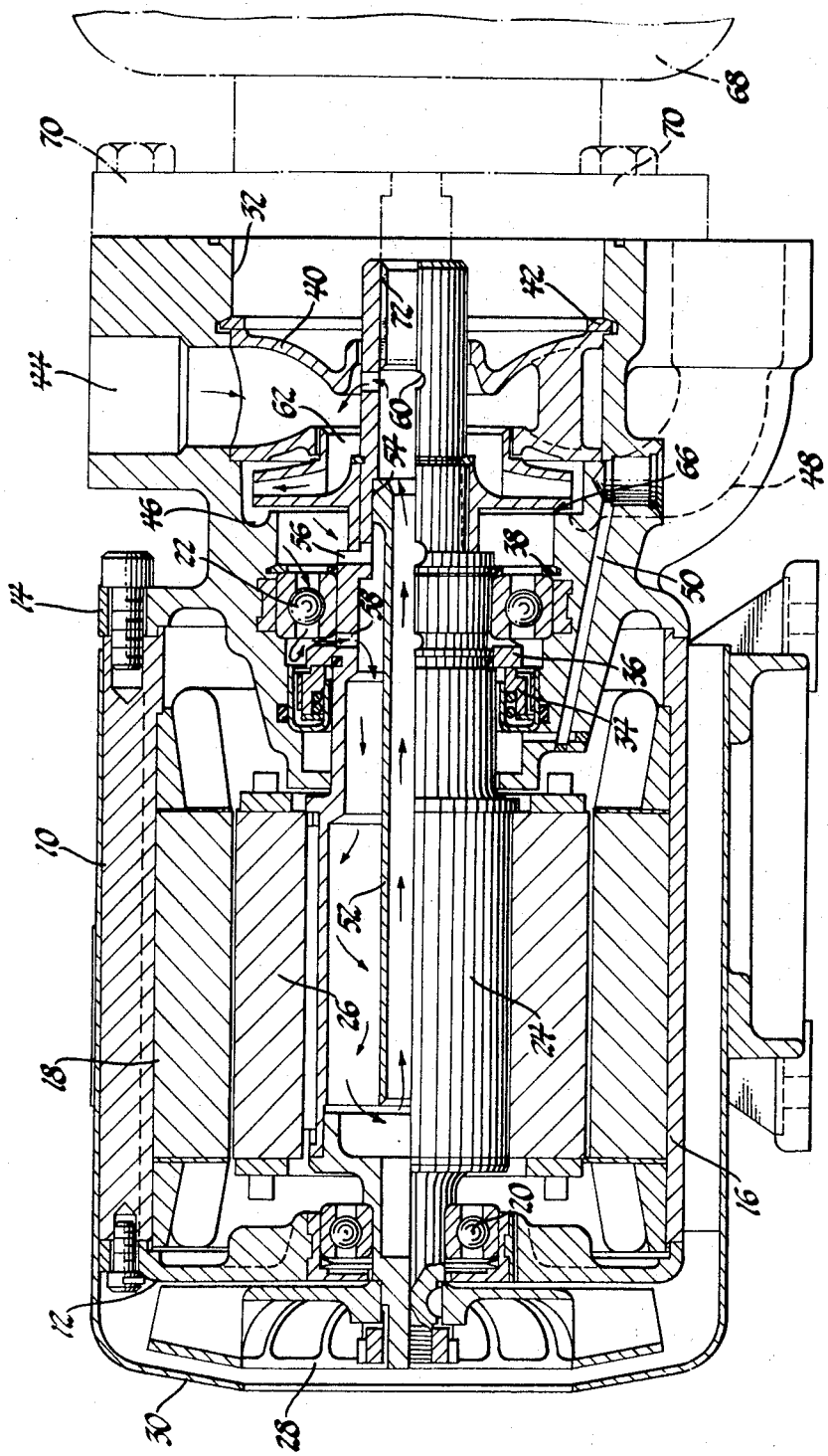
FIG. 1 is a longitudinal cross section of a motor-pump unit incorporating a preferred form of the present invention.
Figure 2:
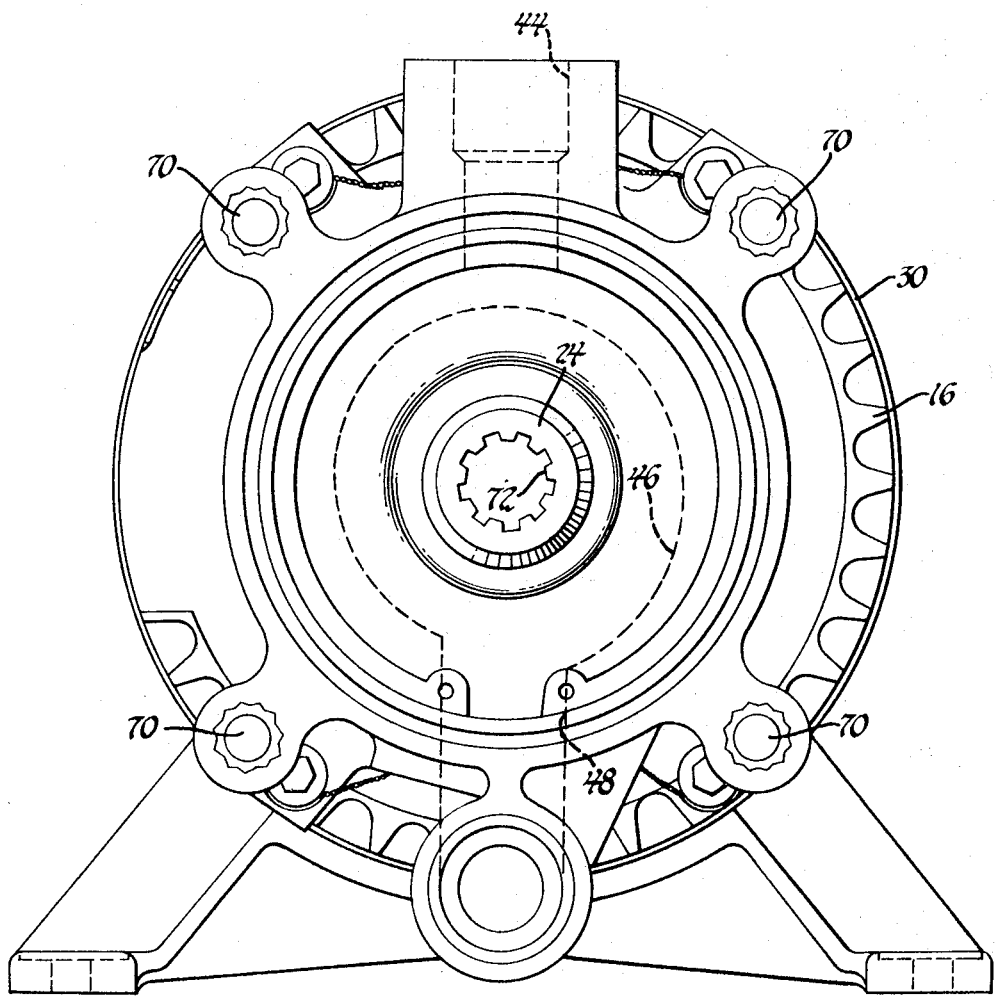
FIG. 2 is an end view of the unit of FIG. 1.

The motor pump unit comprises a stator generally designated 10 having end bells 12 and 14. The stator housing comprises a finned tube 16 carrying the usual stator laminations and windings 18. Journaled on bearings 20 and 22 in the end bells is a drive shaft 24 which carries the usual rotor 26, here shown as of the induction type. The left end of shaft 24 carries a cooling fan 28 and a shroud 30 directs the fan delivery through the fins of the stator housing 16. The motor is here illustrated as one of the explosion proof configuration, but it will be understood that the invention is useful with motors of other configurations as well.

The end bell 14 is formed to serve as the housing of a centrifugal pump and for this purpose is formed with a large bore 32 formed with a number of shoulders as its diameter decreases in steps toward its inboard end. At the innermost end a shaft seal 34 is pressed in the end bell 14 and cooperates with an annular face member 36 rotating with the drive shaft. The outer race of the bearing 22 is positioned in the bore by a snapring 38 and a hemitorroidal intake shroud 40 is retained in the bore 32 by a snapring 42. The shroud 40 communicates with an inlet passage 44 formed in the end bell 14. A portion of the bore 32 is formed as a pump outlet scroll 46 which communicates as indicated in dotted lines with the pump delivery passage 48. A drain passage 50 communicates with the inboard end of the stepped bore 32.

The shaft 24 is hollow and carries a concentric sleeve 52 pressed into the shaft at 54. The sleeve 52 thus forms a reentrant passage for circulation of cooling fluid which may enter the passage at the holes 56 and 58 and leave it at the holes 60, the latter of which lead directly into the intake shroud 40. The impeller 62 is keyed to the shaft 24 and is open at its right-hand end to the intake shroud. Its periphery delivers fluid to the delivery scroll 46 from which a major portion of the pumped fluid travels to the outlet passage 48. A small percentage, however, is permitted to pass from the scroll 46 radially inward through the clearance deliberately introduced at 66 and enters the hollow shaft partly through the holes 56 and partly through the bearing 22 and the holes 58. The latter part flows in direct contact with the shaft seal 34–36. The cooling fluid thence flows to the left through the hollow shaft 24 and into heat conducting relation to the rotor 26 and thence through the sleeve 52 to the holes 60 and the pump inlet.

Preferably, means are provided for mounting a high-pressure hydraulic pump such as indicated at 68 on the right end of the motor pump unit. Studs 70 serve to secure the mounting flange of the pump to the motor-pump unit body and the hollow spline 72 in shaft 24 serves as a coupling for the pump drive shaft. The delivery passage 48 may receive a push-on or other type of coupling for directing the output of the centrifugal pump into the inlet of the high-pressure pump for supercharging purposes.

By using a portion of the delivery of the supercharge pump for cooling purposes and by directing it through a hollow shaft into heat conducting relation with the motor rotor and then redirecting the cooling fluid back to the pump inlet, an efficient cooling system is provided which is particularly effective at high altitudes when the fan cooling system is inadequate. Under these conditions, the much higher specific heat and density of the hydraulic fluid being pumped and its extremely low temperature as it is received by the centrifugal pump all serve to maintain the motor at a reasonable temperature under load. In addition, this circulation of cooling fluid is utilized to lubricate one of the ball bearings and to give direct cooling to the shaft seal.

I claim:

1. An electric motor and pump unit comprising a motor having a stator and a rotor, a hollow drive shaft carrying the rotor in heat conducting relation thereto, a centrifugal pump having a stator and an impeller carried by the motor stator and the drive shaft respectively, inlet and outlet passages for the pump, means forming a reentrant fluid passage within the drive shaft in heat conducting relation to the motor rotor, passages connecting the opposite ends of the reentrant passage with the intake and delivery sides of the impeller, whereby a portion of the fluid delivered by the pump is bypassed through the shaft for cooling purposes, an open ball bearing journaling the drive shaft, and means for directing bypassed fluid through the ball bearing.

2. A unit as defined in claim 1 including a shaft seal inboard of the ball bearing and exposed to fluid flowing through the ball bearing.

* * * * *